US012099933B2

(12) United States Patent
da Silva et al.

(10) Patent No.: US 12,099,933 B2
(45) Date of Patent: Sep. 24, 2024

(54) FRAMEWORK FOR RAPIDLY PROTOTYPING FEDERATED LEARNING ALGORITHMS

(71) Applicant: EMC IP Holding Company LLC, Hopkinton, MA (US)

(72) Inventors: Pablo Nascimento da Silva, Niterói (BR); Paulo Abelha Ferreira, Rio de Janeiro (BR); Tiago Salviano Calmon, Rio de Janeiro (BR); Roberto Nery Stelling Neto, Rio de Janeiro (BR); Vinicius Michel Gottin, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1003 days.

(21) Appl. No.: 17/081,710

(22) Filed: Oct. 27, 2020

(65) Prior Publication Data

US 2022/0129786 A1   Apr. 28, 2022

(51) Int. Cl.
*G06N 3/098* (2023.01)
*G06N 3/08* (2023.01)
(Continued)

(52) U.S. Cl.
CPC .............. *G06N 3/098* (2023.01); *G06N 3/082* (2013.01); *G06N 3/0985* (2023.01); *G06N 20/00* (2019.01); *G06N 3/08* (2013.01); *G06N 20/20* (2019.01)

(58) Field of Classification Search
CPC .......... G06N 20/00; G06N 3/08; G06N 3/082; G06N 3/088; G06N 3/0895; G06N 3/09; G06N 3/091; G06N 3/092; G06N 3/094; G06N 3/096; G06N 3/098; G06N 3/0985; G06N 20/10; G06N 20/20

See application file for complete search history.

(56) References Cited

U.S. PATENT DOCUMENTS

2015/0379072 A1 * 12/2015 Dirac ..................... G06N 20/00
707/693
2016/0110657 A1 * 4/2016 Gibiansky .............. G06N 20/00
706/12

(Continued)

OTHER PUBLICATIONS

Shalev-Shwartz, S., et al., Understanding Machine Learning: From Theory to Algorithms, 2014, 449 pages, Cambridge University Press, New York, NY.

(Continued)

*Primary Examiner* — Shane D Woolwine
(74) *Attorney, Agent, or Firm* — Chamberlain, Hrdlicka, White, Williams & Aughtry; Aly Z. Dossa (57) ABSTRACT

A framework for rapidly prototyping federated learning algorithms. Specifically, the disclosed framework proposes a method and system for evaluating different hypotheses for configuring learning model, which may be optimized through federated learning. Through the disclosed framework, these hypotheses may be tested for scalability, hardware and network resource performance, as well as for new learning state compression and/or aggregation technique effectiveness. Further, these hypotheses may be tested through federated learning simulations, which avoid costs associated with deploying these hypotheses to be tested across production systems.

14 Claims, 6 Drawing Sheets

(51) Int. Cl.
  *G06N 3/082*   (2023.01)
  *G06N 3/0985*  (2023.01)
  *G06N 20/00*   (2019.01)
  *G06N 20/20*   (2019.01)

(56) References Cited

U.S. PATENT DOCUMENTS

2018/0349508 A1* 12/2018 Bequet .................. G06F 18/217
2019/0050743 A1*  2/2019 Chen ..................... G06N 20/20
2021/0019189 A1*  1/2021 Eker ..................... G01V 99/005
2022/0344049 A1* 10/2022 Hall ..................... G06N 3/0464

OTHER PUBLICATIONS

McMahan, H. Brendan, et al., Communication-Efficient Learning of Deep Networks from Decentralized Data, Feb. 28, 2017, 11 pages, Google, Inc., Seattle, WA.

* cited by examiner

FRAMEWORK FOR RAPIDLY PROTOTYPING FEDERATED LEARNING ALGORITHMS

BACKGROUND

Through the framework of federated learning, a network-shared machine learning model may be trained using decentralized data stored on (and without being shared between) various client devices, in contrast to the traditional methodology of using centralized data maintained on a single, central device.

SUMMARY

In general, in one aspect, the invention relates to a system. The system includes a model simulation service that includes a plurality of first computer processors, wherein at least one first computer processor of the plurality of first computer processors is programmed to, for each federated learning simulation of a plurality of federated learning simulations, obtain a simulation configuration for the federated learning simulation, instantiate simulated nodes based on the simulation configuration, emulate learning interactions between the simulated nodes, probe the learning interactions to obtain a simulation analysis, and select, following a completion of the plurality of federated learning simulations, an optimal simulation configuration from a plurality of simulation configurations and based on a plurality of simulation analyses for the plurality of federated learning simulations.

In general, in one aspect, the invention relates to a method for deploying an optimal federated learning system. The method includes, for each federated learning simulation of a plurality of federated learning simulations, obtaining a simulation configuration for the federated learning simulation, instantiating simulated nodes based on the simulation configuration, emulating learning interactions between the simulated nodes, probing the learning interactions to obtain a simulation analysis, selecting, following a completion of the plurality of federated learning simulations, an optimal simulation configuration from a plurality of simulation configurations and based on a plurality of simulation analyses for the plurality of federated learning simulations, and deploying the optimal federated learning system based on the optimal simulation configuration.

In general, in one aspect, the invention relates to a non-transitory computer readable medium (CRM). The non-transitory CRM includes computer readable program code to deploy an optimal federated learning system, which when executed by at least one computer processor, enables the at least one computer processor to, for each federated learning simulation of a plurality of federated learning simulations, obtain a simulation configuration for the federated learning simulation, instantiate simulated nodes based on the simulation configuration, emulate learning interactions between the simulated nodes, probe the learning interactions to obtain a simulation analysis, select, following a completion of the plurality of federated learning simulations, an optimal simulation configuration from a plurality of simulation configurations and based on a plurality of simulation analyses for the plurality of federated learning simulations, and deploy the optimal federated learning system based on the optimal simulation configuration.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a framework for rapidly prototyping federated learning algorithms. Specifically, the disclosed framework proposes a method and system for evaluating different hypotheses for configuring learning model, which may be optimized through federated learning. Through the disclosed framework, these hypotheses may be tested for scalability, hardware and network resource performance, as well as for new learning state compression and/or aggregation technique effectiveness. Further, these hypotheses may be tested through federated learning simulations, which avoid costs associated with deploying these hypotheses to be tested across production systems.

Figure 1:
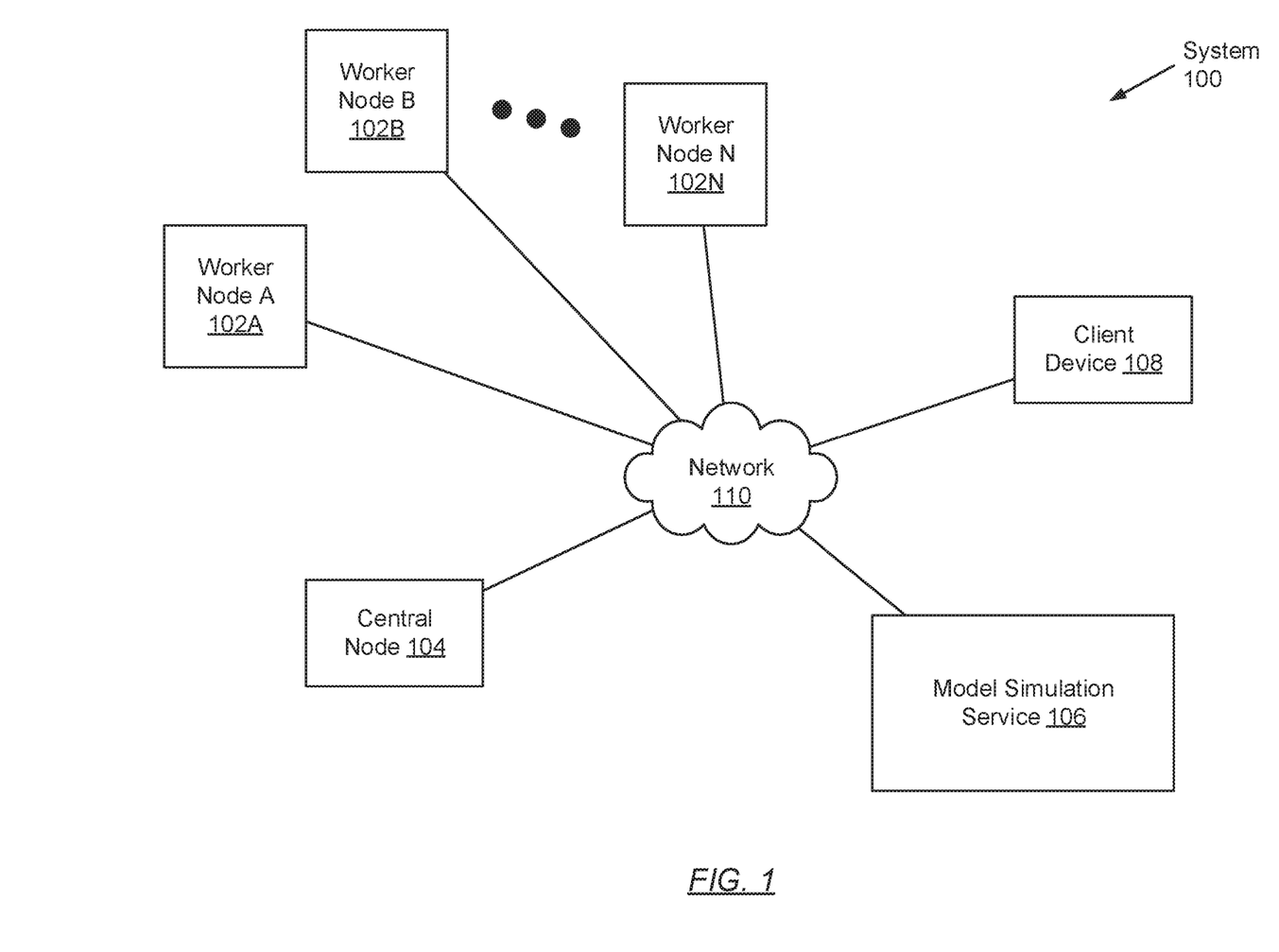
FIG. 1 shows a system in accordance with one or more embodiments of the invention.

FIG. 1 shows a system in accordance with one or more embodiments of the invention. The system (100) may include, but is not limited to, two or more worker nodes (102A-102N), a central node (104), a model simulation service (106), and a client device (108)—all of which may operatively connect to one another through a network (110). Each of these system (100) components is described below.

In one embodiment of the invention, a worker node (102A-102N) may represent any physical appliance or computing system configured to receive, generate, process, store, and/or transmit data, as well as to provide an environment in which one or more computer programs may execute thereon. The computer program(s) may, for example, implement large-scale and complex data processing; or implement one or more services offered locally or over the network (110). Further, any subset of the computer program(s) may employ or invoke machine learning and/or artificial intelligence to perform their respective functions and, accordingly, may participate in federated learning (described below). In providing an execution environment for the computer program(s) installed thereon, a worker node (102A-102N) may include and allocate various resources (e.g., computer processors, memory, storage, virtualization, networking, etc.), as needed, to the computer program(s) and the tasks instantiated thereby. One of ordinary skill will appreciate that a worker node (102A-102N) may perform other functionalities without departing from the scope of the invention. Examples of a worker node (102A-102N) may include, but are not limited to, a desktop computer, a workstation computer, a server, a mainframe, a mobile device, or any other computing system similar to the exemplary computing system shown in FIG. 6. Worker nodes (102A-102N) are described in further detail below with respect to FIG. 2.

In one embodiment of the invention, federated learning may refer to the optimization (i.e., training and/or validation) of machine learning or artificial intelligence models using decentralized data. In traditional learning methodologies, the training and/or validation data, pertinent for optimizing learning models, are often stored centrally on a single device, datacenter, or the cloud. Under some circumstances, however, such as scenarios wherein data restriction constraints or data privacy regulations are observed, the hoarding (or accessing) of all data at (or from) a single location is an unethical violation, and therefore, becomes infeasible. In such scenarios, federated learning may be tapped for learning model optimization without depending on the direct access of restricted or private data. That is, through federated learning, the training and/or validation data may be stored across various devices (i.e., worker nodes (102A-102N))—with each device performing a local optimization of a shared learning model using their respective local data. Thereafter, updates to the shared learning model, derived differently on each device based on different local data, may subsequently be forwarded to a federated learning coordinator (i.e., central node (104)), which aggregates and applies the updates to improve the shared learning model.

In one embodiment of the invention, an above-mentioned learning model may generally refer to a machine learning and/or artificial intelligence algorithm configured for classification and/or prediction applications. A learning model may further encompass any learning algorithm capable of self-improvement through the processing of sample (e.g., training and/or validation) data. Examples of a learning model may include, but are not limited to, a neural network, a support vector machine, and a decision tree.

In one embodiment of the invention, the central node (104) may represent any physical appliance or computing system configured for federated learning (described above) coordination. By federated learning coordination, the central node (104) may include functionality to: aggregate updates from local learning models optimized on the worker nodes (102A-102N); improve global learning models based on the aggregated updates; and deploy the improved global learning models onto the worker nodes (102A-102N) for further optimization. Further, one of ordinary skill will appreciate that the central node (104) may perform other functionalities without departing from the scope of the invention. Moreover, the central node (104) may be implemented using one or more servers (not shown). Each server may represent a physical or virtual server, which may reside in a datacenter or a cloud computing environment. Additionally or alternatively, the central node (104) may be implemented using one or more computing systems similar to the exemplary computing system shown in FIG. 6. The central node (104) is described in further detail below with respect to FIG. 3.

In one embodiment of the invention, the model simulation service (106) may represent information technology (IT) infrastructure configured for rapidly prototyping federated learning (described above) algorithms. To that extent, the model simulation service (106) may include functionality to perform the various steps of the method described in FIG. 5, below. The model simulation service (106) may be implemented using one or more servers (not shown). Each server may represent a physical or virtual server, which may reside in a datacenter or a cloud computing environment. Additionally or alternatively, the model simulation service (106) may be implemented using one or more computing systems similar to the exemplary computing system shown in FIG. 6. The model simulation service (106) is described in further detail below with respect to FIG. 4.

In one embodiment of the invention, the client device (108) may represent any physical appliance or computing system operated by one or more administrators of the system (100). An administrator may refer to an individual or entity whom may be responsible for overseeing system (100) operations and maintenance. To that extent, the client device (108)—at the behest of an administrator—may include functionality to: establish a connection with any other above-mentioned system (100) component; following the establishment of a connection, enable an administrator to sign-in or login into any other above-mentioned system (100) component; and facilitate the deliverance (e.g., via an interface) of administrator inputs and/or commands to any other above-mentioned system (100) component. Further, one of ordinary skill will appreciate that the client device (108) may perform other functionalities without departing from the scope of the invention. Examples of the client device (108) may include, but are not limited to, a desktop computer, a laptop computer, a tablet computer, a workstation computer, a server, a mainframe, a smartphone, or any other computing system similar to the exemplary computing system shown in FIG. 6.

In one embodiment of the invention, the above-mentioned system (100) components may operatively connect to one another through the network (110) (e.g., a local area network (LAN), a wide area network (WAN) such as the Internet, a mobile network, any other network type, or a combination thereof). The network (110) may be implemented using any combination of wired and/or wireless connections. Further, the network (110) may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

While FIG. 1 shows a configuration of components, other system (100) configurations may be used without departing from the scope of the invention.

Figure 2:
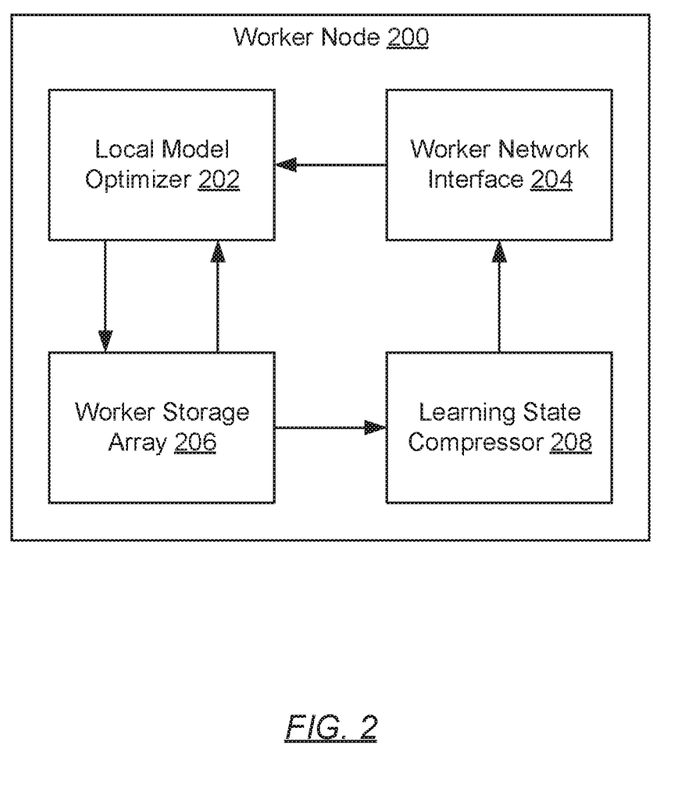
FIG. 2 shows a worker node in accordance with one or more embodiments of the invention.

FIG. 2 shows a worker node in accordance with one or more embodiments of the invention. The worker node (200) may include, but is not limited to, a local model optimizer (202), a worker network interface (204), a worker storage array (206), and a learning state compressor (208). Each of these worker node (200) subcomponents is described below.

In one embodiment of the invention, the local model optimizer (202) may refer to a computer program that may execute on the underlying hardware of the worker node (200). Specifically, the local model optimizer (202) may be responsible for optimizing (i.e., training and/or validating) one or more learning models (described above). To that extent, for any given learning model, the local model optimizer (202) may include functionality to: select local data (described below) pertinent to the given learning model from the worker storage array (206); process the selected local data using the given learning model to adjust learning state (described below) of, and thereby optimize, the given learning model; repeat the aforementioned functionalities for the given learning model until a learning state request is received from the central node; and, upon receiving the learning state request, provide the latest local data adjusted learning state to the learning state compressor (208) (via the worker storage array (206)) for processing. Further, one of ordinary skill will appreciate that the local model optimizer (202) may perform other functionalities without departing from the scope of the invention.

In one embodiment of the invention, the above-mentioned local data (which may be stored in the worker storage array (206)) may, for example, include one or more collections of data—each representing tuples of feature-target data pertinent to optimizing a given learning model (not shown) deployed on the worker node (200). Each feature-target tuple, of any given data collection, may refer to a finite ordered list (or sequence) of elements, including: a feature set; and one or more expected (target) classification or prediction values. The feature set may refer to an array or vector of values (e.g., numerical, categorical, etc.)—each representative of a different feature (i.e., measurable property or indicator) significant to the objective or application of the given learning model, whereas the expected classification/prediction value(s) (e.g., numerical, categorical, etc.) may each refer to a desired output of, upon processing of the feature set by, the given learning model.

In one embodiment of the invention, the above-mentioned learning state may refer to one or more factors pertinent to the automatic improvement (or "learning") of a learning model through experience—e.g., through iterative optimization using various sample training and/or validation data. The aforementioned factor(s) may differ depending on the design, configuration, and/or operation of the learning model. For a neural network based learning model, for example, the factor(s) may include, but is/are not limited to: weights representative of the connection strengths between pairs of nodes structurally defining the neural network; weight gradients representative of the changes or updates applied to the weights during optimization based on output error of the neural network; and/or a weight gradients learning rate defining the speed at which the neural network updates the weights. Further, the above-mentioned local data adjusted learning state may represent learning state optimized based on or derived from any subset of local data stored in the worker storage array (206).

In one embodiment of the invention, the worker network interface (204) may refer to networking hardware (e.g., network card or adapter), a logical interface, an interactivity protocol, or any combination thereof, which may be responsible for facilitating communications between the worker node (200) and any other above-mentioned system component (e.g., central node, model simulation service, and/or client device (not shown)). To that extent, the worker network interface (204) may include functionality to: receiving learning models (shared via federated learning) from the central node; provide the learning models for optimization to the local model optimizer (202); receive learning state requests from the central node; following notification of the learning state requests to the local model optimizer (202), obtain compressed learning state from the learning state compressor (208); and transmit the compressed learning state to the central node in response to the learning state requests. Further, one of ordinary skill will appreciate that the worker network interface (204) may perform other functionalities without departing from the scope of the invention.

In one embodiment of the invention, the worker storage array (206) may refer to a collection of one or more physical storage devices (not shown) on which various forms of digital data—e.g., local data (i.e., input and target data) (described above) pertinent to the training and/or validation of learning models—may be consolidated. Each physical storage device may encompass non-transitory computer readable storage media on which data may be stored in whole or in part, and temporarily or permanently. Further, each physical storage device may be implemented based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the worker storage array (206) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the learning state compressor (208) may refer to a computer program that may execute on the underlying hardware of the worker node (200). Specifically, the learning state compressor (208) may be responsible for learning state compression. To that extent, the learning state compressor (208) may include functionality to: obtain local data adjusted learning state from the local model optimizer (202) (via the worker storage array (206)); compress the obtained local data adjusted learning state using any existing (or future developed) data compression technique, resulting in compressed local data adjusted learning state; and providing the compressed local data adjusted learning state to the worker network interface (204) for transmission to the central. Further, one of ordinary skill will appreciate that the learning state compressor (208) may perform other functionalities without departing from the scope of the invention.

While FIG. 2 shows a configuration of subcomponents, other worker node (200) configurations may be used without departing from the scope of the invention.

Figure 3:
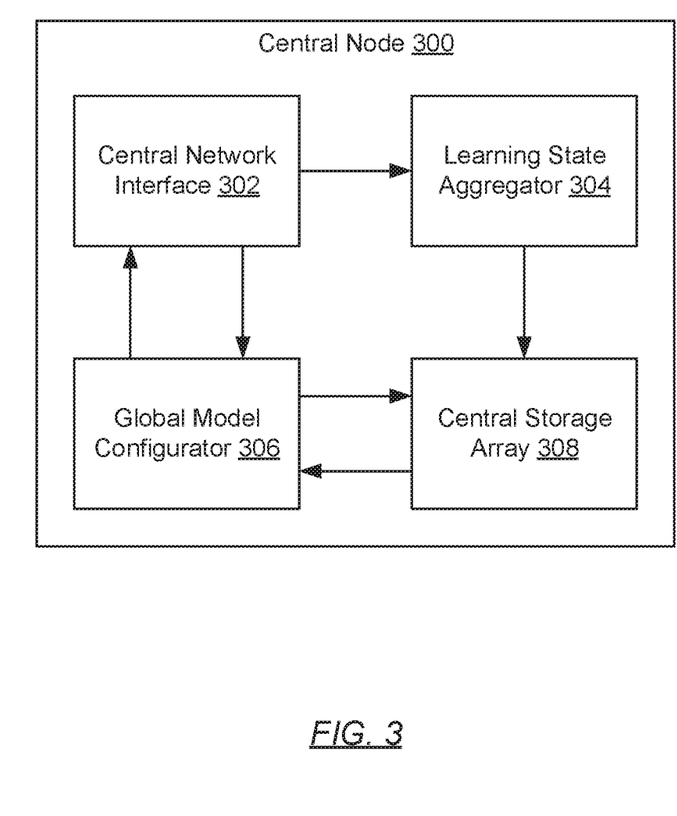
FIG. 3 shows a central node in accordance with one or more embodiments of the invention.

FIG. 3 shows a central node in accordance with one or more embodiments of the invention. The central node (300) may include, but is not limited to, a central network interface (302), a learning state aggregator (304), a global model configurator (306), and a central storage array (308). Each of these central node (300) subcomponents is described below.

In one embodiment of the invention, the central network interface (302) may refer to networking hardware (e.g., network card or adapter), a logical interface, an interactivity protocol, or any combination thereof, which may be responsible for facilitating communications between the central node (300) and any other above-mentioned system component (e.g., worker nodes, model simulation service, and/or client device (not shown)). To that extent, the central network interface (302) may include functionality to: obtain learning models from the global model configurator (306) and/or the model simulation service; distribute (i.e., transmit) the obtained learning models to the worker nodes for optimization (i.e., training and/or validation); issue learning state requests to the worker nodes upon detection of triggers directed to learning model update operations; in response to the issuance of the learning state requests, receive compressed local data adjusted learning state from each of the worker nodes; and provide the compressed local data adjusted learning state to the learning state aggregator (304) for processing. Further, one of ordinary skill will appreciate that the central network interface (302) may perform other functionalities without departing from the scope of the invention.

In one embodiment of the invention, the learning state aggregator (304) may refer to a computer program that may execute on the underlying hardware of the central node (300). Specifically, the learning state aggregator (304) may be responsible for compressed local data adjusted learning state collection and decompression. To that extent, the learning state aggregator (304) may include functionality to: obtain compressed local data adjusted learning state originating from the worker nodes (not shown) via the central network interface (302); decompress the obtained compressed local data adjusted learning state using any existing (or future developed) data decompression technique (i.e., compatible with the data compression technique employed by the learning state compressor on the worker nodes (see e.g., FIG. 2)), resulting in local data adjusted learning state; and storing the local data adjusted learning state in the central storage array (308) (from where the local data adjusted learning state may be accessed by the global model configurator (306) for processing). Further, one of ordinary skill will appreciate that the learning state aggregator (304) may perform other functionalities without departing from the scope of the invention.

In one embodiment of the invention, the global model configurator (306) may refer to a computer program that may execute on the underlying hardware of the central node (300). Specifically, the global model configurator (306) may be responsible for global learning model improvement. To that extent, the global model configurator (306) may include functionality to: configure learning models using/with initial learning state given by the model simulation service or the client device (not shown); provide the initialized learning models to the central network interface (302) for dissemination to the worker nodes (not shown); retrieve various local data adjusted learning state (described above) (see e.g., FIG. 2) from the central storage array (308), which had been deposited therein by the learning state aggregator (304) following data decompression; process the various local data adjusted learning state (e.g., apply summary statistics, such as averaging, etc.), resulting in aggregated learning state; update the learning models using the aggregated learning state; and provide the updated learning models to the central network interface (302) for dissemination to the worker nodes. Further, one of ordinary skill will appreciate that the global model configurator (306) may perform other functionalities without departing from the scope of the invention.

In one embodiment of the invention, the central storage array (308) may refer to a collection of one or more physical storage devices (not shown) on which various forms of data—e.g., various learning states (e.g., initial, local data adjusted, aggregated, etc.) for one or more learning models, etc.—may be consolidated. Each physical storage device may encompass non-transitory computer readable storage media on which data may be stored in whole or in part, and temporarily or permanently. Further, each physical storage device may be implemented based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the central storage array (308) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 3 shows a configuration of subcomponents, other central node (300) configurations may be used without departing from the scope of the invention.

Figure 4:
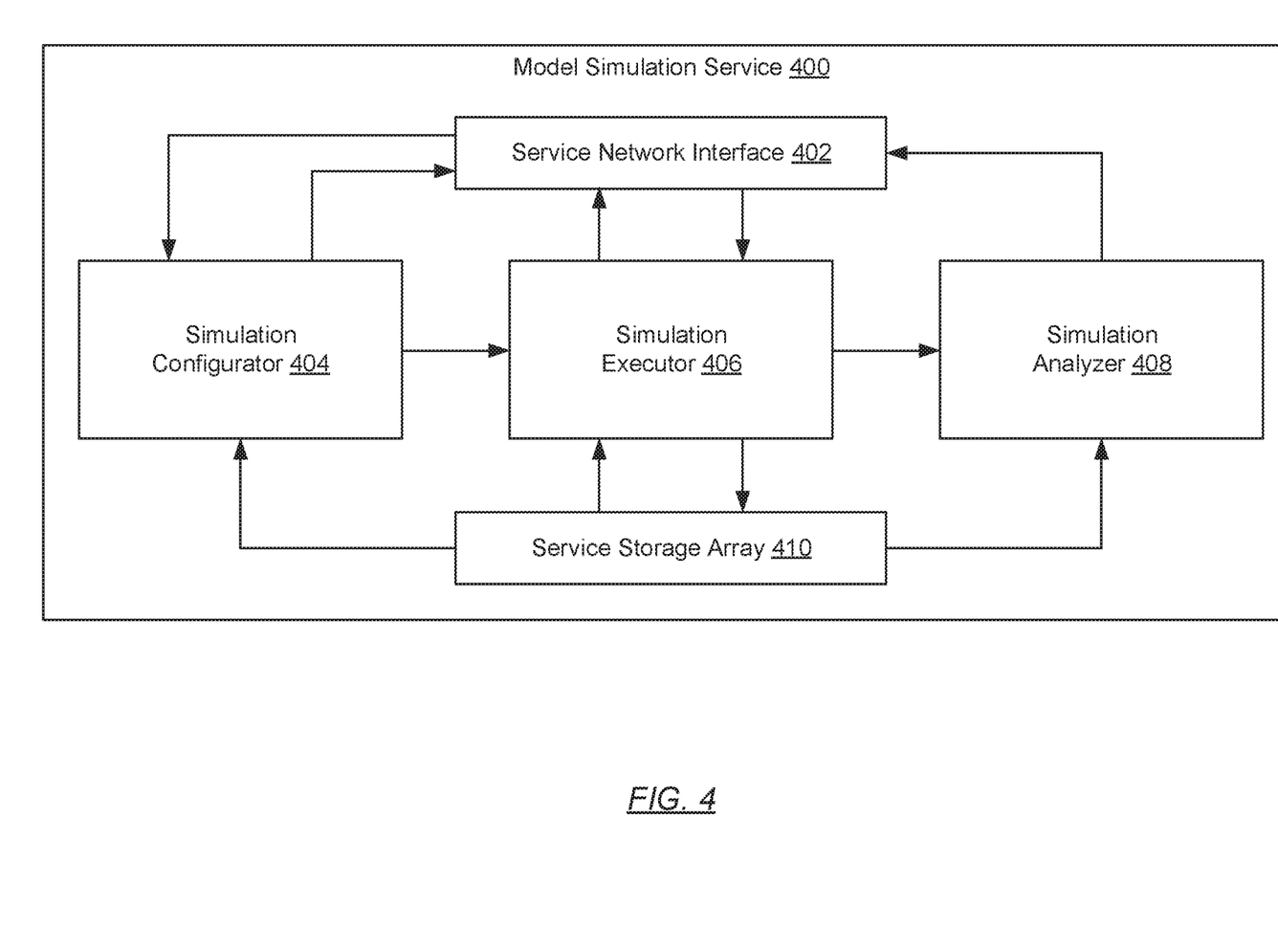
FIG. 4 shows a model simulation service in accordance with one or more embodiments of the invention.

FIG. 4 shows a model simulation service in accordance with one or more embodiments of the invention. The model simulation service (400) may include, but is not limited to, a service network interface (402), a simulation configurator (404), a simulation executor (406), a simulation analyzer (408), and a service storage array (410). Each of these model simulation service (400) subcomponents is described below.

In one embodiment of the invention, the service network interface (402) may refer to networking hardware (e.g., network card or adapter), a logical interface, an interactivity protocol, or any combination thereof, which may be responsible for facilitating communications between the model simulation service (400) and any other above-mentioned system component (e.g., worker nodes, central node, and/or client device (not shown)). To that extent, the service network interface (402) may include functionality to: enable an administrator to sign-in/login into the model simulation service (400) via the client device and, accordingly, allow the administrator to enter inputs and/or issue commands; relay the entered inputs and/or issued commands to the simulation configurator (404) and/or the simulation executor (406) for processing; obtain comparative visualizations from the simulation analyzer (408) for presentation to the administrator; select (either through artificial intelligence decisions or the administrator) an optimal federated learning configuration based, at least in part, on the comparative visualizations; and deploy at least a portion of the optimal federation learning configuration for real-world applications to the central and worker nodes. Further, one of ordinary skill will appreciate that the service network interface (402) may perform other functionalities without departing from the scope of the invention.

In one embodiment of the invention, the simulation configurator (404) may refer to a computer program that may execute on the underlying hardware of the model simulation service (400). Specifically, the simulation configurator (404) may be responsible for defining federated learning simulations. To that extent, the simulation configurator (404) may include functionality to: enable an administrator to specify a scenario configuration (described below) for each of one or more simulations; and provide the scenario configuration(s) to the simulation executor (406) for simulation execution. Further, one of ordinary skill will appreciate that the simulation configurator (404) may perform other functionalities without departing from the scope of the invention.

In one embodiment of the invention, a scenario configuration may refer to a collection of parameters, which may define a given federated learning simulation. These parameters may include, but are not limited to, a simulated central node class, a number of simulated worker nodes to employ, a behavior pattern for the simulated central node and/or worker nodes, an architecture (described below) for the learning model through which federated learning on the simulated central node and/or worker nodes may be performed, chosen datasets for emulating local data (described above) (see e.g., FIG. 2) on the simulated worker nodes, a chosen aggregation function employed by the simulated central node through which learning state from the various simulated worker nodes may be aggregated and used to update a global learning model, and a learning state compression technique to be employed by the simulated worker nodes when forwarding learning state to the simulated central node during the federated learning process. A scenario configuration is not limited to the aforementioned parameter examples.

In one embodiment of the invention, the architecture of a learning model may refer to a collection of parameters used to define the configuration and operation of the learning model. These parameters may vary depending on the paradigm (e.g., neural network, support vector machine, decision tree, etc.) of the learning model, and may be classified as learning model parameters or learning model hyper-parameters. A learning model parameter may refer to variable that may be adjusted (or optimized) during a training runtime (or epoch) of the learning model, whereas a learning model hyper-parameter may refer to a variable that may be adjusted (or optimized) prior to or between training runtimes (or epochs) of the learning model.

By way of examples, learning model parameters, pertinent to a neural network based learning model, may include, but are not limited to: the weights representative of the connection strengths between pairs of nodes structurally defining the model; and the weight gradients representative of the changes or updates applied to the weights during optimization based on the output error of the neural network. Further, examples of learning model hyper-parameters, pertinent to a neural network based learning model, may include, but are not limited to: the number of hidden node layers and, accordingly, the number of nodes in each hidden node layer, between the input and output layers of the model; the activation function(s) used by the nodes of the model to translate their respective inputs to their respective outputs; and the weight gradients learning rate defining the speed at which the neural network updates the weights.

In one embodiment of the invention, the simulation executor (406) may refer to a computer program that may execute on the underlying hardware of the model simulation service (400). Specifically, the simulation executor (406) may be responsible for overseeing federated learning simulation management. To that extent, the simulation executor (406) may include functionality to: obtain scenario configurations (described above) from the simulation configurator (404); instantiate federated learning simulations (e.g., by employing one or more computer processors, such as central processing units (CPUs) and/or graphics processing units (GPUs)) based on given scenario configurations; enable an administrator to specify an execution configuration (described below) for each of one or more federated learning simulations; execute the instantiated federated learning simulations based on the execution configurations; monitor or probe the executing federated learning simulations to obtain simulation analyses (described below); and provide the obtained simulation analyses to the simulation analyzer (406) for processing. Further, one of ordinary skill will appreciate that the simulation executor (406) may perform other functionalities without departing from the scope of the invention.

In one embodiment of the invention, an execution configuration may refer to a collection of parameters, which may be used to define an execution runtime of a given federation learning simulation. These parameters may include, but are not limited to, a seed used to initialize the behavior of (and thus shared between) simulated nodes of the given federated learning simulation, a number of optimization samples (i.e., feature-target tuples) to reside on each simulated worker node, a batch size or a subset number of optimization samples per batch for training and/or validation purposes, a proportion of optimization samples to be used during a training stage of learning model optimizations, a proportion of optimization samples to be used during a validation stage of learning model optimizations, a proportion of optimization samples on each simulated worker node to be sent to the simulated central node for testing purposes, and a learning rate of the simulated central node and/or simulated worker nodes. An execution configuration is not limited to the aforementioned parameter examples.

In one embodiment of the invention, a simulation analysis may refer to a collection of observations and/or metrics that may be used to assess a given federated learning simulation. These observations and/or metrics may pertain, but are not limited to, learning state compression performance, learning model optimization convergence, learning state evolution, worker node communication acknowledgement, and round trip time for worker node local learning model updates. A simulation analysis is not limited to the aforementioned observation and/or metric examples.

In one embodiment of the invention, the simulation analyzer (408) may refer to a computer program that may execute on the underlying hardware of the model simulation service (400). Specifically, the simulation analyzer (408) may be responsible for rendering comparative visualizations. To that extent, the simulation analyzer (408) may include functionality to: obtain simulation analyses (described above) from the simulation executor (406); process the obtained simulation analyses, resulting in the attainment of useful, comparative information and/or visualizations; and providing the useful, comparative information and/or visualizations to the service network interface (402). Further, one of ordinary skill will appreciate that the simulation analyzer (408) may perform other functionalities without departing from the scope of the invention.

In one embodiment of the invention, the service storage array (410) may refer to a collection of one or more physical storage devices (not shown) on which various forms of data—e.g., datasets for emulating local data (described above) (see e.g., FIG. 2) on any simulated worker nodes, templates for different learning model architectures, default values for various parameters, etc.—may be consolidated. Each physical storage device may encompass non-transitory computer readable storage media on which data may be stored in whole or in part, and temporarily or permanently. Further, each physical storage device may be implemented based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the service storage array (410) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 4 shows a configuration of subcomponents, other model simulation service (400) configurations may be used without departing from the scope of the invention.

Figure 5:
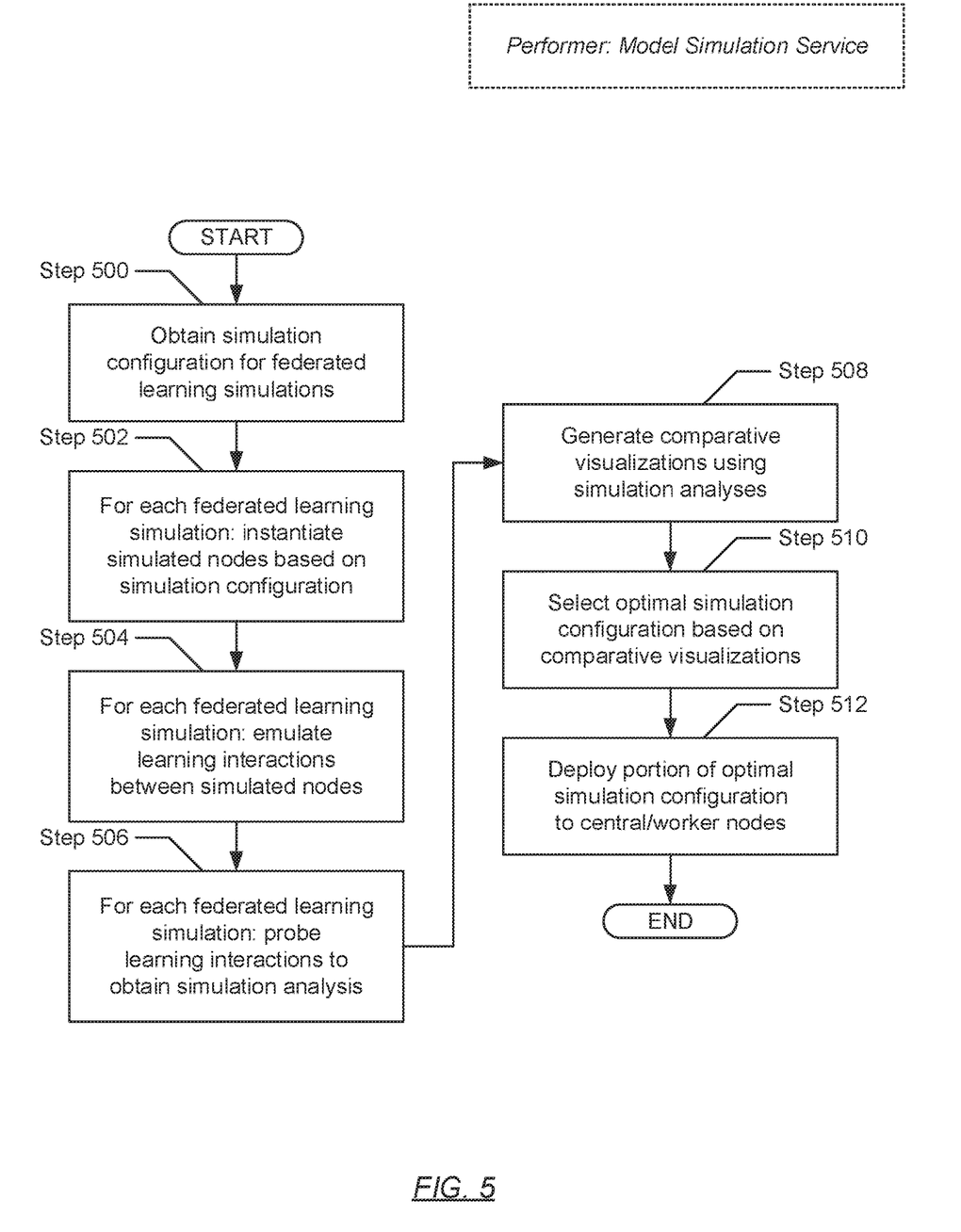
FIG. 5 shows a flowchart describing a method for rapidly prototyping federated learning algorithms in accordance with one or more embodiments of the invention.

FIG. 5 shows a flowchart describing a method for rapidly prototyping federated learning algorithms in accordance with one or more embodiments of the invention. The various steps may be performed substantially by the model simulation service (see e.g., FIGS. 1 and 4). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, a simulation configuration is obtained for each of two or more federated learning simulations. In one embodiment of the invention, a simulation configuration may refer to a collection of parameters, which may define an architecture, as well as an operation, of a given federated learning simulation. These parameters may be segmented into a scenario configuration including various scenario parameters (described above in the description for the simulation configurator) (see e.g., FIG. 4) respective to simulation architecture, or an execution configuration including various execution parameters (described above in the description for the simulation executor) (see e.g., FIG. 4) respective to simulation operation. Further, these parameters may be obtained as inputs from an administrator or based on artificial intelligence decisions.

In Step 502, for each federated learning simulation, simulated nodes are instantiated based on the simulation configuration (obtained in Step 500). In one embodiment of the invention, each federated learning simulation may be implemented, for example, through one or more virtual machines, which may execute on the underlying hardware (e.g., one or more central processing units (CPUs) and/or graphics processing units (GPUs)) of the model simulation service. Further, the simulated nodes may include a simulated central node and at least two simulated worker nodes. Any simulated node may refer to a computer program, computer process, or computer thread, which may execute within the virtual machine(s) representative of a federated learning simulation. Moreover, instantiation of the simulated nodes may encompass using the above-mentioned scenario configuration portion of the simulation configuration.

In Step 504, for each federated learning simulation, learning interactions between the simulated nodes (instantiated in Step 502) are emulated. In one embodiment of the invention, these learning interactions may pertain to the separate behaviors of each simulated node when participating in federated learning (described above) (see e.g., FIG. 1). Further, these learning interactions may be governed, at least in part, by the above-mentioned execution configuration portion of the simulation configuration (obtained in Step 500).

In Step 506, for each federated learning simulation, the learning interactions (emulated in Step 504) are probed. In one embodiment of the invention, probing the learning interactions may entail capturing various observations and/or tracking various metrics, which may aid in the future assessment of the federated learning simulation. These observations and/or metrics may pertain, but are not limited to, learning state compression performance, learning model optimization convergence, learning state evolution, worker node communication acknowledgement, and round trip time for worker node local learning model updates. Further, these observations and/or metrics may collectively also be referred to a simulation analysis.

In Step 508, one or more comparative visualizations is/are generated. That is, in one embodiment of the invention, following the completed executions of the two or more federated learning simulations, useful, comparative information and/or visualizations may be created from the two or more simulation analyses (obtained in Step 506) thereof. Substantively, the useful, comparative information and/or visualizations may arrange the above-mentioned observations and/or metrics, and other information derived therefrom, in such a way as to facilitate comparisons to be performed between the two or more simulation configurations defining the two or more federated learning simulations, respectively.

In Step 510, an optimal simulation configuration is selected based, at least in part, on the comparative information and/or visualizations (generated in Step 508). In one embodiment of the invention, selection of the optimal simulation configuration, from the two or more simulation configurations (obtained in Step 500), may be determined using the validation error, or using the ratio of validation error to data compression ratio, achieved by the simulation configuration. Further, the selection may be performed by an artificial intelligence or an administrator.

In Step 512, at least a portion of the optimal simulation configuration (selected in Step 510) is deployed onto a real-world system of central and worker nodes. Specifically, in one embodiment of the invention, one or more aspects of the above-mentioned scenario configuration portion (e.g., an architecture for the learning model through which federated learning on the central node and/or worker nodes may be performed, a learning state compression technique to be employed by the worker nodes when forwarding learning state to the central node during the federated learning process, etc.) of the optimal simulation configuration may be used to configure/initialize the real-world central and/or worker nodes. Also, one or more aspects of the above-mentioned execution configuration portion (e.g., a batch size or a subset number of optimization samples per batch for training and/or validation purposes to be used by the worker nodes, a proportion of optimization samples to be used during a training stage of learning model optimizations, a proportion of optimization samples to be used during a validation stage of learning model optimizations, a learning rate of the central node and/or worker nodes, etc.) of the optimal simulation configuration may further be used to configure/initialize the real-world central and/or worker nodes.

Figure 6:
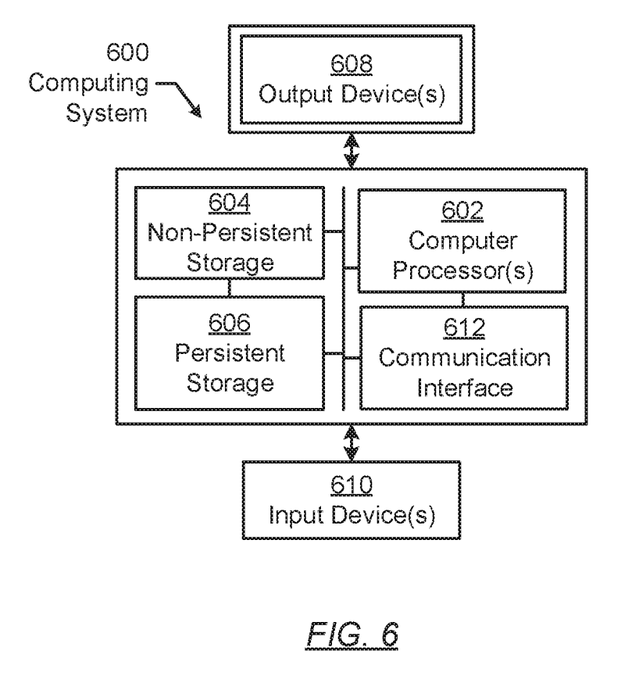
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a model simulation service, comprising:
  a plurality of computer processors,
  wherein at least one computer processor of the plurality of computer processors is programmed to:
    for each federated learning simulation of a plurality of federated learning simulations:
      obtain a simulation configuration for the federated learning simulate on;
      instantiate simulated nodes based on the simulation configuration;
      emulate learning interactions between the simulated nodes;
      probe the learning interactions to obtain a simulation analysis;
    select, following a completion of the plurality of federated learning simulations, an optimal simulation configuration from a plurality of simulation configurations and based on a plurality of simulation analyses for the plurality of federated learning simulations,
a central node operatively connected to the model simulation service and comprising a computer processor,
a plurality of worker nodes operatively connected to the model simulation service and the central node, and each comprising a computer processor,
wherein the at least one computer processor of the model simulation service is further programmed to:
  deploy a first portion of the optimal simulation configuration to the central node,
  deploy a second portion of the optimal simulation configuration to each worker node of the plurality of worker nodes,
  wherein the first portion of the optimal simulation configuration comprises an architecture for a global learning model through which the central node uses to participate in federated learning,
  wherein the architecture for the global learning model comprises a plurality of learning model parameters and a plurality of learning model hyper-parameters, and
  wherein the plurality of learning model parameters comprises a weight representing a connection strength between the simulated nodes.

2. The system of claim 1, wherein the simulation configuration comprises a scenario configuration portion specifying a first collection of parameters that define an architecture of the federated learning simulation.

3. The system of claim 2, wherein the simulation configuration further comprises an execution configuration portion specifying a second collection of parameters that govern an operation of the federated learning simulation.

4. The system of claim 1, wherein the simulated nodes comprise a simulated central node and a plurality of simulated worker nodes programmed to participate in federated learning.

5. The system of claim 1, wherein a learning state decompression technique for restoring compressed learning state submitted during federated learning into learning state is used by the central node to update the global learning model, and a learning rate defining a speed at which the central node updates the global learning model.

6. The system of claim 1, wherein the second portion of the optimal simulation configuration comprises an architecture for a local learning model through which each worker node uses to participate in federated learning, a learning state compression technique for reducing a size of the learning state submitted to the central node during federated learning, a learning rate defining a speed at which each worker node updates the local learning model thereon, a first proportion size of local data to be used by each worker node to train the local learning model, and a second proportion size of local data to be used by each worker node to validate the local learning model.

7. A method for deploying an optimal federated learning system, comprising:
for each federated learning simulation of a plurality of federated learning simulations:
obtaining a simulation configuration for the federated learning simulation;
instantiating simulated nodes based on the simulation configuration;
emulating learning interactions between the simulated nodes;
probing the learning interactions to obtain a simulation analysis;
selecting, following a completion of the plurality of federated learning simulations, an optimal simulation configuration from a plurality of simulation configurations and based on a plurality of simulation analyses for the plurality of federated learning simulations; and
deploying the optimal federated learning system based on the optimal simulation configuration,
wherein the optimal federated learning system comprises a central node operatively connected to a plurality of worker nodes, wherein the central node and the plurality of worker nodes participate in federated learning, and
wherein deploying comprises:
deploying a first portion of the optimal simulation configuration to the central node,
deploying a second portion of the optimal simulation configuration to each worker node of the plurality of worker nodes,
wherein the first portion of the optimal simulation configuration comprises an architecture for a global learning model through which the central node uses to participate in federated learning,
wherein the architecture for the global learning model comprises a plurality of learning model parameters and a plurality of learning model hyper-parameters, and
wherein the plurality of learning model parameters comprises a weight representing a connection strength between the simulated nodes.

8. The method of claim 7, wherein the first portion of the optimal simulation configuration comprises an architecture for a global learning model through which the central node uses to participate in federated learning, a learning state decompression technique for restoring compressed learning state submitted during federated learning into learning state used by the central node to update the global learning model, and a learning rate defining a speed at which the central node updates the global learning model.

9. The method of claim 7, wherein the second portion of the optimal simulation configuration comprises an architecture for a local learning model through which each worker node uses to participate in federated learning, a learning state compression technique for reducing a size of the learning state submitted to the central node during federated learning, a learning rate defining a speed at which each worker node updates the local learning model thereon, a first proportion size of local data to be used by each worker node to train the local learning model, and a second proportion size of local data to be used by each worker node to validate the local learning model.

10. The method of claim 7, wherein the simulation configuration comprises a scenario configuration portion specifying a first collection of parameters that define an architecture of the federated learning simulation.

11. The method of claim 10, wherein the simulation configuration further comprises an execution configuration portion specifying a second collection of parameters that govern an operation of the federated learning simulation.

12. A non-transitory computer readable medium (CRM) comprising computer readable program code to deploy an optimal federated learning system, which when executed by at least one computer processor, enables the at least one computer processor to:
for each federated learning simulation of a plurality of federated learning simulations:
obtain a simulation configuration for the federated learning simulation;
instantiate simulated nodes based on the simulation configuration;
emulate learning interactions between the simulated nodes;
probe the learning interactions to obtain a simulation analysis;
select, following a completion of the plurality of federated learning simulations, an optimal simulation configuration from a plurality of simulation configurations and based on a plurality of simulation analyses for the plurality of federated learning simulations; and
deploy the optimal federated learning system based on the optimal simulation configuration,
wherein the optimal federated learning system comprises a central node operatively connected to a plurality of worker nodes, wherein the central node and the plurality of worker nodes participate in federated learning, and
wherein deploying comprises:
deploying a first portion of the optimal simulation configuration to the central node,
deploying a second portion of the optimal simulation configuration to each worker node of the plurality of worker nodes,
wherein the first portion of the optimal simulation configuration comprises an architecture for a global learning model through which the central node uses to participate in federated learning,
wherein the architecture for the global learning model comprises a plurality of learning model parameters and a plurality of learning model hyper-parameters, and
wherein the plurality of learning model parameters comprises a weight representing a connection strength between the simulated nodes.

13. The non-transitory CRM of claim 12, wherein the first portion of the optimal simulation configuration comprises an architecture for a global learning model through which the central node uses to participate in federated learning, a learning state decompression technique for restoring compressed learning state submitted during federated learning into learning state used by the central node to update the global learning model, and a learning rate defining a speed at which the central node updates the global learning model.

14. The non-transitory CRM of claim 12, wherein the second portion of the optimal simulation configuration comprises an architecture for a local learning model through which each worker node uses to participate in federated learning, a learning state compression technique for reducing a size of the learning state submitted to the central node during federated learning, a learning rate defining a speed at which each worker node updates the local learning model thereon, a first proportion size of local data to be used by each worker node to train the local learning model, and a second proportion size of local data to be used by each worker node to validate the local learning model.

\* \* \* \* \*